United States Patent [19]

Stumpff et al.

[11] Patent Number: 5,310,054
[45] Date of Patent: May 10, 1994

[54] STORAGE CONTAINER FOR DISK-SHAPED OBJECT

[75] Inventors: David L. Stumpff; Yosihiko Taniyama, both of Alpharetta, Ga.

[73] Assignee: Sony Corporation, Tokyo, Japan

[21] Appl. No.: 869,815

[22] Filed: Apr. 16, 1992

[51] Int. Cl.$^5$ ............................................. B65D 85/57
[52] U.S. Cl. .................................. 206/310; 206/309
[58] Field of Search ............... 206/303, 307, 309–313, 206/387, 444, 588, 814; 220/410

[56] References Cited

U.S. PATENT DOCUMENTS

| | | | |
|---|---|---|---|
| 4,535,888 | 8/1985 | Nusselder | 206/444 |
| 4,613,044 | 9/1986 | Saito et al. | 206/444 |
| 4,702,369 | 10/1987 | Philosophe | 206/312 |
| 4,714,157 | 12/1987 | Morrone | 206/387 |
| 4,750,611 | 6/1988 | Morrone | 206/45.13 |
| 4,793,480 | 12/1988 | Gelardi et al. | 206/312 |
| 4,817,792 | 4/1989 | Seifert | 206/309 |
| 4,819,799 | 4/1989 | Nomula et al. | 206/310 |
| 4,850,477 | 7/1989 | Gelardi et al. | 206/45.19 |
| 4,865,195 | 9/1989 | Brands | 206/387 |
| 4,874,085 | 10/1989 | Grobecker et al. | 206/309 |
| 4,875,743 | 10/1989 | Geldardi et al. | 312/13 |
| 4,895,252 | 1/1990 | Nomula et al. | 206/310 |
| 4,899,875 | 2/1990 | Herr et al. | 206/313 |
| 4,916,567 | 4/1990 | Grobecker et al. | 360/133 |
| 4,998,618 | 3/1991 | Borgions | 206/307 |
| 5,050,734 | 9/1991 | Chen | 206/444 |
| 5,101,971 | 4/1992 | Grobecker | 206/232 |

FOREIGN PATENT DOCUMENTS 0420350  4/1991  European Pat. Off. ............ 206/310

*Primary Examiner*—Jimmy G. Foster
*Attorney, Agent, or Firm*—William S. Frommer; Alvin Sinderbrand

[57] ABSTRACT

A storage container for disk-shaped objects is described which includes a base tray, a cover, a disk-tray, a means for connecting the cover to the base tray in a hinged manner, and a means for connecting the disk tray to the base tray. The base tray includes an inside bottom surface, a pair of side walls protruding upwardly from the bottom surface, and a rear wall extending upwardly from the bottom surface. The disk tray for receiving the disk-shaped object may have an open window or may have a floor. The container can also be used without the disk tray by including extensions protruding upwardly from the bottom surface of the base tray to substantially surround the disk-shaped object.

4 Claims, 7 Drawing Sheets

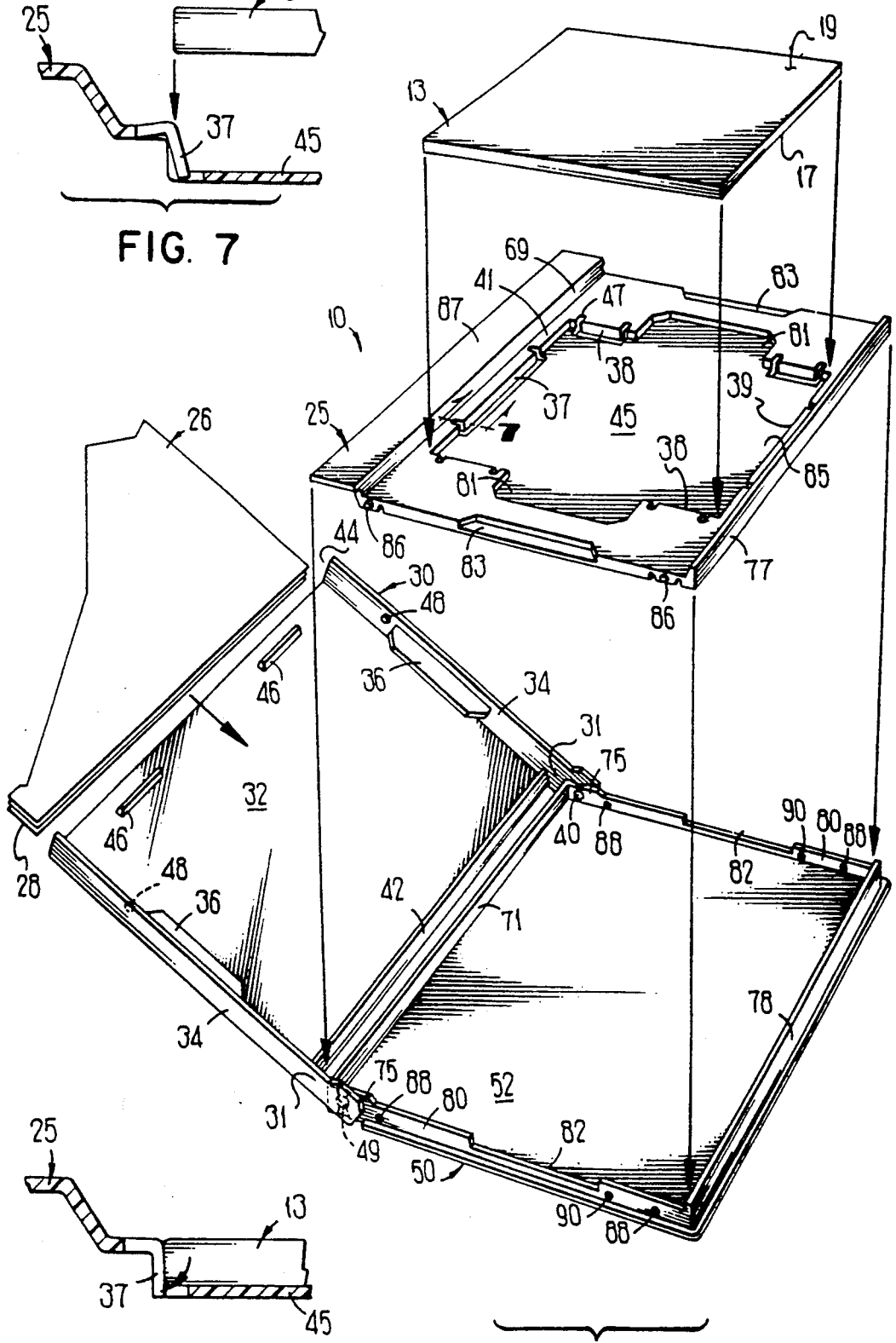

STORAGE CONTAINER FOR DISK-SHAPED OBJECT

BACKGROUND OF THE INVENTION

1. Field of Invention

This invention relates to a storage case for disks. More specifically, this invention relates to a two or three-component transparent container in which disks containing information, such as mini-compact disks ("mini-CD's"), may be packaged for retail sale and/or used for storage by the consumer.

2. Description of the Prior Art

As shown in FIG. 17, conventional storage containers for a standard compact disk 12 or the like are often called "jewel boxes." The "jewel box" is usually made of transparent plastic and is rectangular in shape. Many such jewel boxes include three distinct components: a rectangular base tray 50', a corresponding rectangular cover 30', and a mounting hub (not shown). Usually, the base tray and cover are pivotally connected at their base corners to form a clam shell-like enclosure, and the mounting hub is inserted into the base tray.

The cover of the jewel box may have interior walls which correspond to the total height of the container. These walls may have several inwardly protruding tabs which are used to hold a promotional booklet or other identifying material 26' in a position where it can be viewed through the cover. When secured into place under the tabs, these articles usually cover the disk and act as a top view display.

The base tray of these prior art jewel boxes is determined to be slightly larger than a typical compact disk in all dimensions. In one type of jewel box, several tabs protrude from the interior walls of the base tray. The mounting hub is inserted into place on top of these tabs and a promotional card may be placed face down on the base tray's interior surface under the tabs. Installing the mounting hub on top of the card allows the consumer to readily identify the contents of the "jewel box" from both the bottom and the top of the package. The interior surface of the base tray may also include arced ribs which extend upwardly and surround the disk in a manner such that the cover is prevented from touching the disk. However, the location of the ribs makes them ineffective to protect the disk when a cover breaks as a result of force applied to it.

A conventional mounting hub for the above described jewel box is usually hollow and is formed of a central circular recess and a central circular mount. The mount holds the disk securely when the disk is inserted into the container. The recess allows the disk to rest easily in the container and also allows easy removal of the disk from the container.

Small cut-outs are usually formed on the side walls of the base tray and small matching extensions are correspondingly formed on the side walls of the cover. The fit between the cut-outs and the extensions usually causes enough interference to sustain the container in the normally closed position. The end of the cover usually extends slightly over the end of the base thereby allowing one to pry open the cover with one hand, while holding the container in the other hand.

Another prior art embodiment of the jewel box for standard compact disks incorporates only two components: the cover and the base tray. The base tray has the mounting hub molded into it. In order to compensate for not being able to insert a promotional card in the inside of the base tray, as described in the conventional "jewel box," the bottom surface of this base try is recessed and several tabs protrude under the bottom surface from exterior walls of the base tray. This construction allows a card to be inserted on the outside of the container under the bottom surface of the base tray. This embodiment is less expensive to build than the conventional "jewel box," since it is made up of only two components and uses less raw materials than the standard "jewel box." However, the automated manufacturing process, which includes inserting the back promotional card onto the exterior of the base tray, is more expensive and time consuming. The increased cost of production occurs because the tabs and/or protruding side walls adjacent the recessed bottom of the surface of the base tray often get caught in the automatic machines. For this reason, the insert cards and disk are often inserted by hand or extra maintenance for the machine must be expended to keep the production line up and running.

Until recently, the standard compact disk was the only size optical disk carrying audio information. However, today many recording companies are leaning towards using a smaller version of the standard compact disk, known as a mini-compact disk. Since the mini-compact disk can not be stored in an existing standard compact disk container, a need for a compact disk container, which can store and display a mini-compact disk and can be used in commercially available existing standard compact disk racks, is needed.

SUMMARY OF THE INVENTION

Accordingly it is an object of this invention to provide a container for mini-compact disks or the like which may be used in existing standard compact disk retail racks.

It is another object of this invention to provide a container for mini compact disks or the like which includes a means for identifying the enclosed disk from the bottom view of the container.

It is yet another object of this invention to provide a two component container for mini-compact disks or the like which may be used in existing standard compact disk retail racks.

It is a further object of this invention to provide a two component container for mini-compact disks or the like in which the bottom surface of the base tray is not recessed and include a means for identifying the enclosed disk from the bottom view of the container.

It is yet a further object of this invention to provide additional support for the cover of the container in the closed position.

These and other objects are achieved by the disk container of the present invention. In one preferred embodiment, the container is made up of three main components, a base tray, a cover, and a disk tray. The base tray is pivotally connected to the cover, and the disk tray is inserted into the base tray. The container has dimensions in which the width is slightly larger than the width of a mini-disk and the length is slightly larger than the diameter of a standard disk. By incorporating a container with the same length as a standard disk box, the container may be used in already existing retail racks.

The cover of this embodiment has two parallel side walls which define the height of the container. One or more tabs protrude inwardly from each of these walls.

The tabs are used to secure a thin promotional booklet or any other materials against the inside top surface of the cover. When inserted into place, the promotional material usually covers the entire disk from the top view. Even if promotional material is not enclosed within the cover, by inserting the disk into the container with the label side face-up, the consumer may readily identify the enclosed disk via the top view through the cover.

The base tray of the above embodiment has at least two parallel walls. These walls may have cut outs corresponding to the tabs in the cover, thereby providing a recess in which the cover tabs may rest when the container is in the closed position. On at least one of the parallel side walls of the base-tray, there is at least one small depression that correspondingly matches a small protrusion that extends from an interior portion of at least one side wall of the cover. The depression and matching protrusion secure the container in the closed position.

On at least one of the parallel side walls of the base tray, there is also at least one small depression that correspondingly matches at least one small protrusion that extends from an exterior portion of at least one side wall of the disk tray. The depression and matching protrusion secure the disk tray when it is inserted into the base tray.

An interior front wall which is located opposite the hinged portion is slightly recessed, so that the front end of the cover extends over it. Thereby, one is able to pry open the cover with one finger while holding the container in place with the other hand.

The disk tray of this first configuration has a rimmed center opening window having dimensions slightly larger than the length and the width of a mini-disk. A small cut out in at least one corner allows the disk to rest comfortably and securely. On at least one side of the rimmed center opening is a finger insert recession, which allows one to easily retrieve the disk. The rear rim of the center opening acts as a rest for the cover when the container is in the closed position.

The side walls of the disk tray may have cut outs which line up with the cut outs in the base tray and correspond to the tabs in the cover. Thereby, a recess is created, in which the cover tabs may rest when the container is in the closed position.

In a first arrangement, the disk may be inserted into the disk tray with its label facing downward, and a booklet or other promotional material may be inserted within the cover under the tabs. When the container is in the closed position, the consumer can easily identify the contents of the container from the top-view, and can readily view additional information on the disk's label from the bottom-view.

In a second arrangement, promotional material facing downward may be inserted into the base tray before the disk tray is inserted, and the disk may be inserted with its label facing upward or downward depending on whether a booklet or other promotional material is inserted within the cover. When the container is in the closed position, the consumer can easily identify the contents from the bottom view by way of the promotional material, and may identify the contents of the container from the top view via additional promotional material or the disk's label.

In another configuration, the disk tray has a floor attached to the bottom of the center opening. For this embodiment, the disk and promotional material may be inserted in much the same way as described for the second arrangement of the first configuration.

In a third configuration, the three component container having the disk tray with the center opening window may have a mounting hub, corresponding to the central opening of the disk, formed integrally with a bottom surface of the base tray. The hub is used to provide added assurance that the disk remains secure within the container. For this configuration, the disk and promotional material may be inserted and applied in much the same way as the first arrangement of the first configuration.

In a fourth configuration, the three component container having the disk tray with a floor attached to the bottom of the center opening may have a mounting hub, corresponding to the central opening of the disk, formed integrally with a bottom surface of the disk tray. Again, the hub is employed for added stabilization of the disk within the container. For this embodiment, the disk and promotional material may be inserted and applied as described for the disk tray having a floor without a hub attached to the bottom of the center opening.

In an alternative preferred embodiment, the container is made up of two main components, a base tray and a cover. Four raised rims are formed integrally with a bottom inside surface of the base tray. The raised rims substantially surround the disk, such that the disk rests comfortably and securely without the need for a distinct disk tray. The rear raised rim acts as a rest for the cover when the container is in the closed position. The disk may be inserted within the raised rims with its label facing down, and a booklet or other promotional material may be inserted within the cover to allow the consumer to readily identify the contents of the container from the top and bottom views.

BRIEF DESCRIPTION OF THE DRAWINGS

The accompanying drawings illustrate several presently preferred but nevertheless illustrative embodiments of the invention, and serve to aid in the explanation of the principles of the invention.

FIG. 6 is an exploded perspective view of the container in the open position, with a disk tray having a floor, a disk and a booklet ready for insertion.

FIG. 7 is a cross-sectional side view of the container in the open position along line 7 of FIG. 6, with a disk ready for insertion into the disk tray having a floor.

FIG. 8 is a sectional side view of the container in the open position along line 7 in FIG. 6 with a disk and a booklet inserted into the disk tray having a floor.

DETAILED DESCRIPTION OF THE PREFERRED EMBODIMENT

Figure 1:
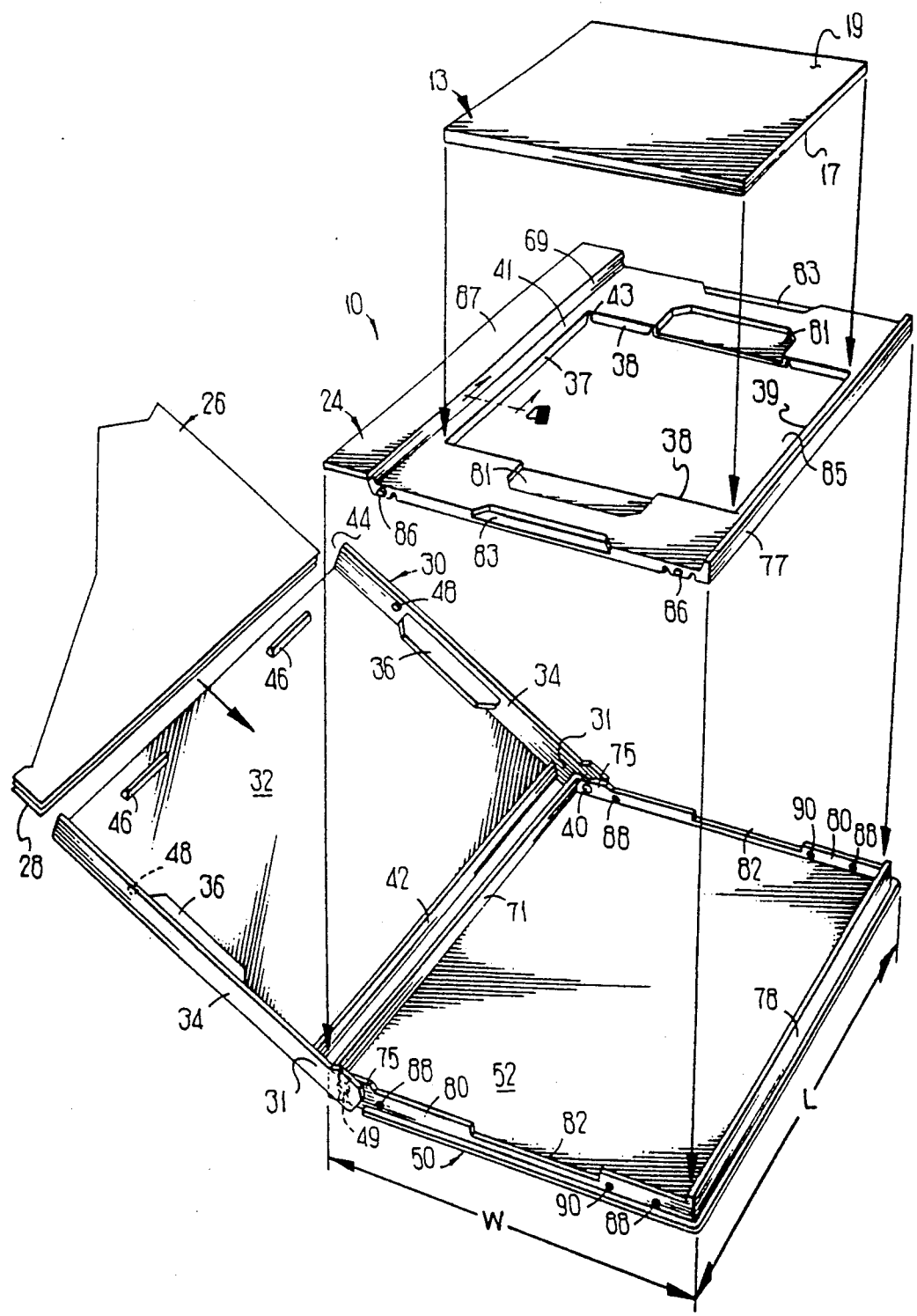
FIG. 1 is an exploded perspective view of the container in the open position, with the disk tray having a window, a disk and a booklet ready for insertion.

As shown in FIG. 1 in a preferred embodiment of the invention, a storage container 10 is preferably formed of a transparent, plastic material. The container 10 is formed of three main components, a base tray 50, a cover 30, and a disk tray 24. Though the dimensions of the container 10 may vary to adapt to different sized disks, a preferred embodiment is designed for a typical mini-disk 13. The width of the container 10 is approximately 91 millimeters, which is designed to be slightly larger than the width of a mini-disk. The length of the container 10 is approximately 121.6 millimeters which adapts the container for use in already existing retail racks for standard size CD containers.

The cover 30 includes two side walls 34 which extend perpendicularly from a top surface 32. From each side wall 34 one or more side tabs 36 protrude inwardly. The side tabs 36 are positioned a sufficient distance from the top surface 32 to allow for the insertion of a booklet or card 26 between the side tabs 36 and the top surface 32. The booklet or card 26 may thus be viewed through the top surface 32 of the cover 30. The booklet or card 26 may be inserted, with its graphics side 28 (see FIG. 2) facing the top surface 32, into the cover 30 from an open front end 44 of the cover 30 and slid under the tabs 36 until it rests against a rear wall 42 of the cover 30. Small front tabs 46 protrude upwardly from a portion of the inside surface of the cover 30 adjacent its front end 44 of the cover 30 to keep the booklet or card 26 in place once it rests against the rear wall 42. At least one side wall 34, but preferably both, also has a capture protrusion 48 extending inwardly. Each rearward end 31 of both cover side walls 34 has a pivot protrusion 40 extending inwardly.

The base tray 50 includes a bottom surface 52, a pair of side walls 80, a front wall 78, and a rear wall 71. Each side wall 80 has notches 82, which correspond in position to the tabs 36 of the cover 30. At least one side wall 80, but preferably both, also has a cover capture dimple 90, which correspondingly matches the capture protrusion 48 extending from the cover 30. At least one side wall 80, but preferably both, also has a disk tray capture dimple 88 on both sides of the side wall notch 82. Each base tray side rear wall 75 has a pivot depression 49 (see FIG. 2), which corresponds to the pivot protrusion 40 on the cover 30.

The disk tray 24 has a rear wall 69, a front wall 77, and a rimmed center opening 85 having dimensions slightly larger than the length and the width of a mini-disk 13. The rimmed center opening 85 is made up of a rear rim 37, two side rims 38 and a front rim 39, which are flexible and meet at cut out corners 43. Each side rim 38 has a notch 83 on its exterior, which corresponds in position to the notches 82 of the base tray 50 and the tabs 36 of the cover 30. At least one side rim 38, but preferably both, has a finger insert 81 formed in its interior which preferably is centered between the cut out corners 43. The exterior of each side rim 38 also has capture protrusions 86 located on both sides of the side wall notches 83, which correspond to the capture dimples 88 of the base tray 50.

Molded to the top of the rear wall 69 of the disk tray 24 is a rear ledge 87, which extends across the pivot region of the base tray 50. The rear ledge 87 is supported by at least one, but preferably three structural ribs 35 (see FIG. 3). Molded to the bottom of the rear wall 69 and the top of the rear rim 37 is a rear cover support 41, which serves as a rest for the cover's rear wall 42 when the container 10 is in the closed position.

The base tray 50 and the cover 30 are attached by mating the pivot protrusions 40 on the cover 30 with the pivot depressions 49 (see FIG. 2) in the base tray 50. The base tray's front wall 78 is slightly recessed so that the cover's front end 44 extends over it to allow one to pry open the cover 30 with a finger while holding the container 10 in the other hand. The cover 30 rotates about an axis centered horizontally through the length of the rear wall 71.

The disk tray 24 is attached to the base tray 50 by inserting the disk tray capture protrusions 86 into the base tray's disk tray capture dimples 88. When the disk tray 24 is inserted, its front wall 77 rests flush against the base tray's front wall 78, and the exterior of each disk tray side rim 38 rests flush against the interior of each base tray side wall 80. The disk tray's rear ledge 87 rests on top of the base tray's rear wall 71.

Figure 2:
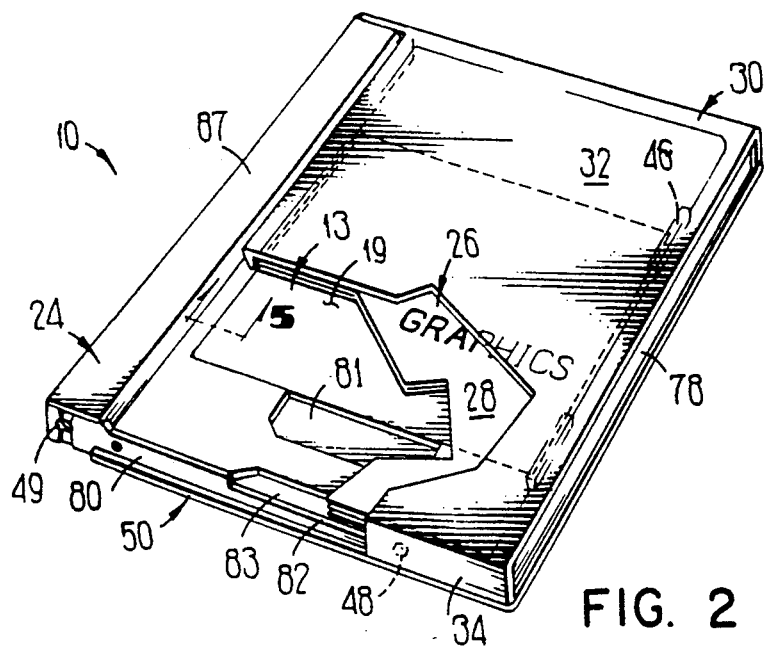
FIG. 2 is a top cut away perspective view of the container in the closed position, with the disk tray, a disk and a booklet.
Figure 3:
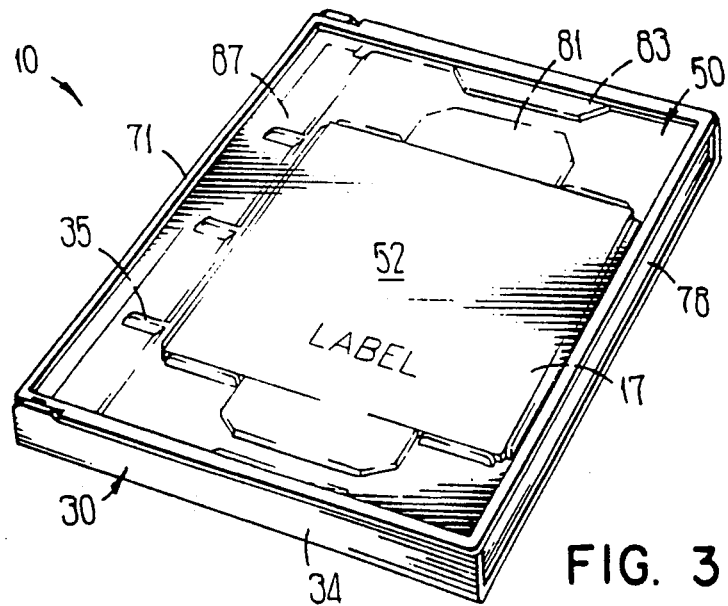
FIG. 3. is a bottom perspective view of the container in the closed position, with the disk tray and a disk.
Figure 4:
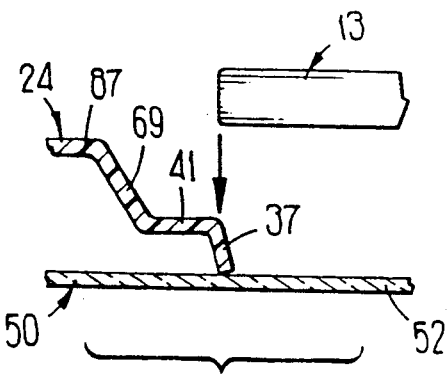
FIG. 4 is a cross-sectional side view of the container in the open position along line 4 in FIG. 1, with a disk ready for insertion into the disk tray having a window.
Figure 5:
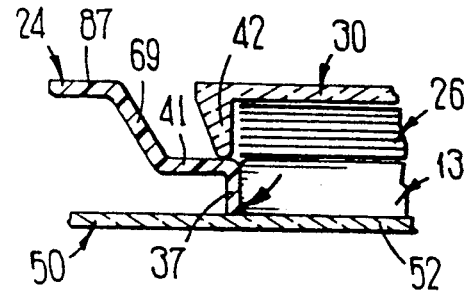
FIG. 5 is a cross-sectional side view of the container in the closed position along line 5 in FIG. 2, with a disk and a booklet inserted.

As shown in FIG. 2, a mini-disk 13 may be placed in the container 10 in the disk tray's center opening 85 of the disk tray 24. A booklet or card 26 is securely inserted under the cover 30. The disk 13 is inserted into the disk tray 24 with the non-label side 19 facing the cover 30. The booklet or card 26 can be readily seen through the cover's transparent top 32. Also, as shown in FIG. 3, the disk's label 17 can be observed through the base tray's transparent bottom surface 52.

As best shown in FIGS. 2 through 5, when the disk 13 is inserted, the bottom portion of the flexible rims 37, 38 and 39 flex outward to encompass and secure the disk 13. When the container 10 is in the closed position, the cover's rear wall 42 rests on top of the disk tray's rear cover support 41.

In another configuration, as shown in FIG. 6, the disk tray 25 is substantially similar to the disk tray 24 in FIG. 1. However, this disk tray 25 has a floor 45 attached to the bottom of the center opening 85. The rear rim 37, the two side rims 38, the front rim 39, and the finger inserts 81 have rigid bottom portions to support the floor 45. Also, instead of cut out corners 43 (See FIG. 1), this disk tray 25 has at least one side cut out 47, but preferably two, located on the interior of the side rims 38 on each side of the finger inserts 81 and on the interior of the rear rim 37 and the front rim 39. As shown in FIGS. 7 and 8, when the disk 13 is inserted, the rims 37, 38 and 39 surround the disk 13 to ensure that it rests comfortably and securely.

Figures 9, 10:
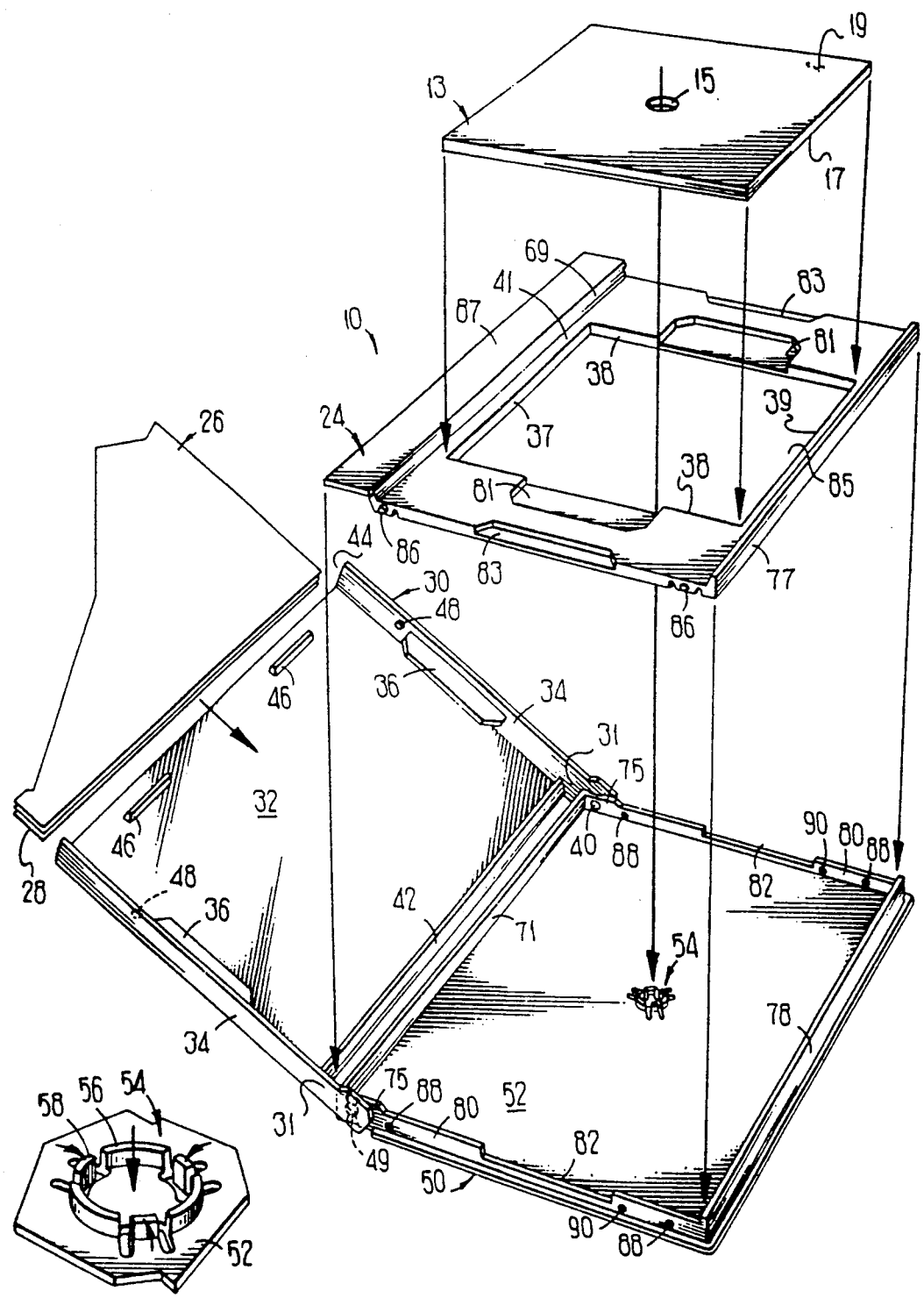
FIG. 9 is an exploded perspective view of the container in the open position, having a mounting hub in the base tray, with the disk tray having a window, a disk and a booklet ready for insertion.
FIG. 10 is a top perspective view of the mounting hub.

In yet another configuration, as shown in FIG. 9, the cover 30, and the disk tray 24 with the center opening 85 may be used in conjunction with a base tray 50 having a circular mounting hub 54 formed integrally with its bottom surface 52. The disk, via its center hole 15, may be mounted on top of the mounting hub 54. As shown in FIG. 10, the mounting hub 54 has a raised circular mount 56 and raised fingers 58. The mounting hub 54 gives added assurance that the disk 13 will remain secure within the container 10.

Figure 11:
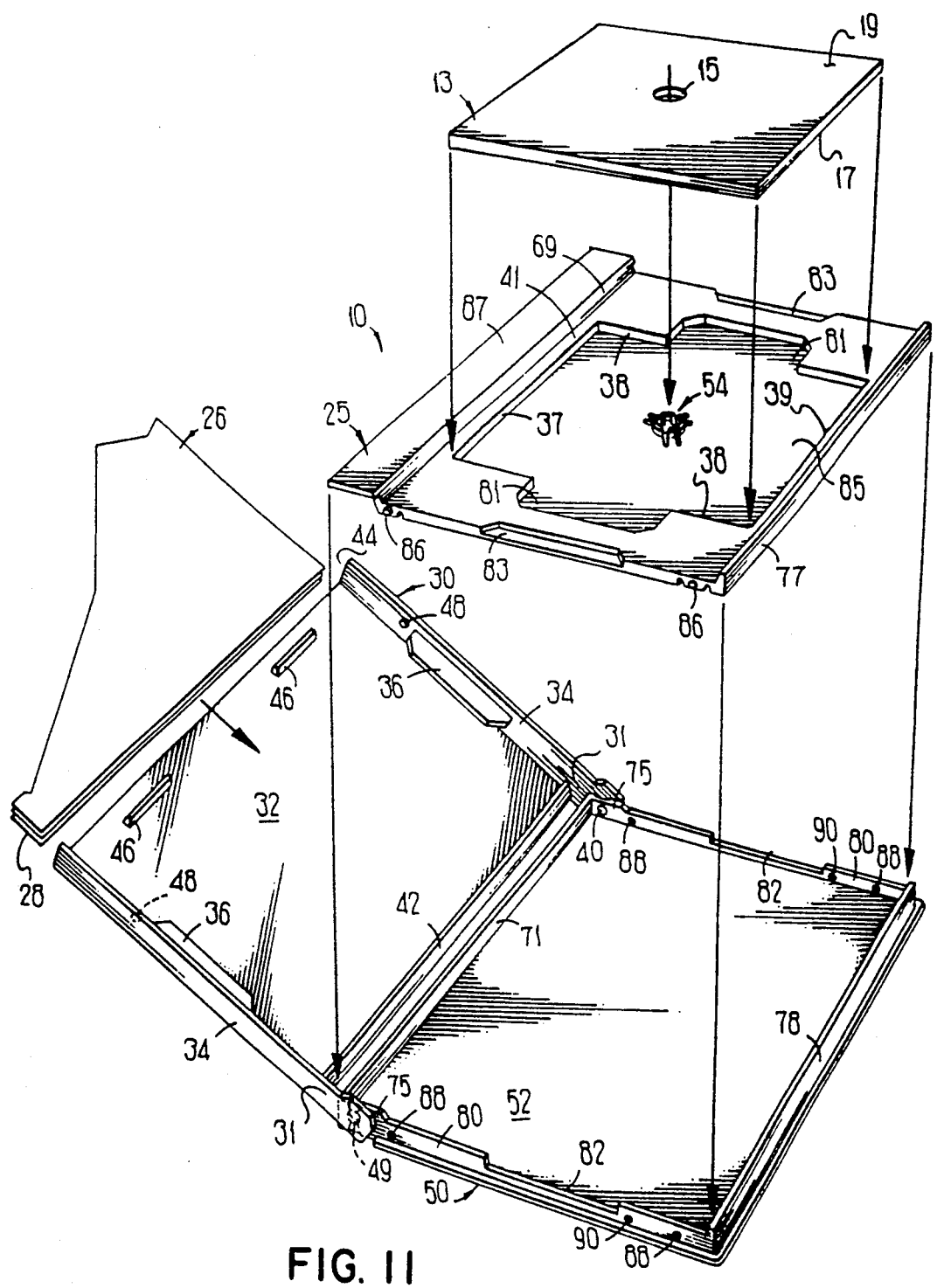
FIG. 11 is an exploded perspective view of the container in the open position with the disk tray having a floor and a mounting hub, a disk and a booklet ready for insertion.

In a further configuration, as shown in FIG. 11, the disk tray with a floor 25 may have a circular mounting hub 54 formed integrally to the center of the floor 45. Again, the mounting hub 54 reassures that the disk 13 remains secure inside the container 10.

Figure 12:
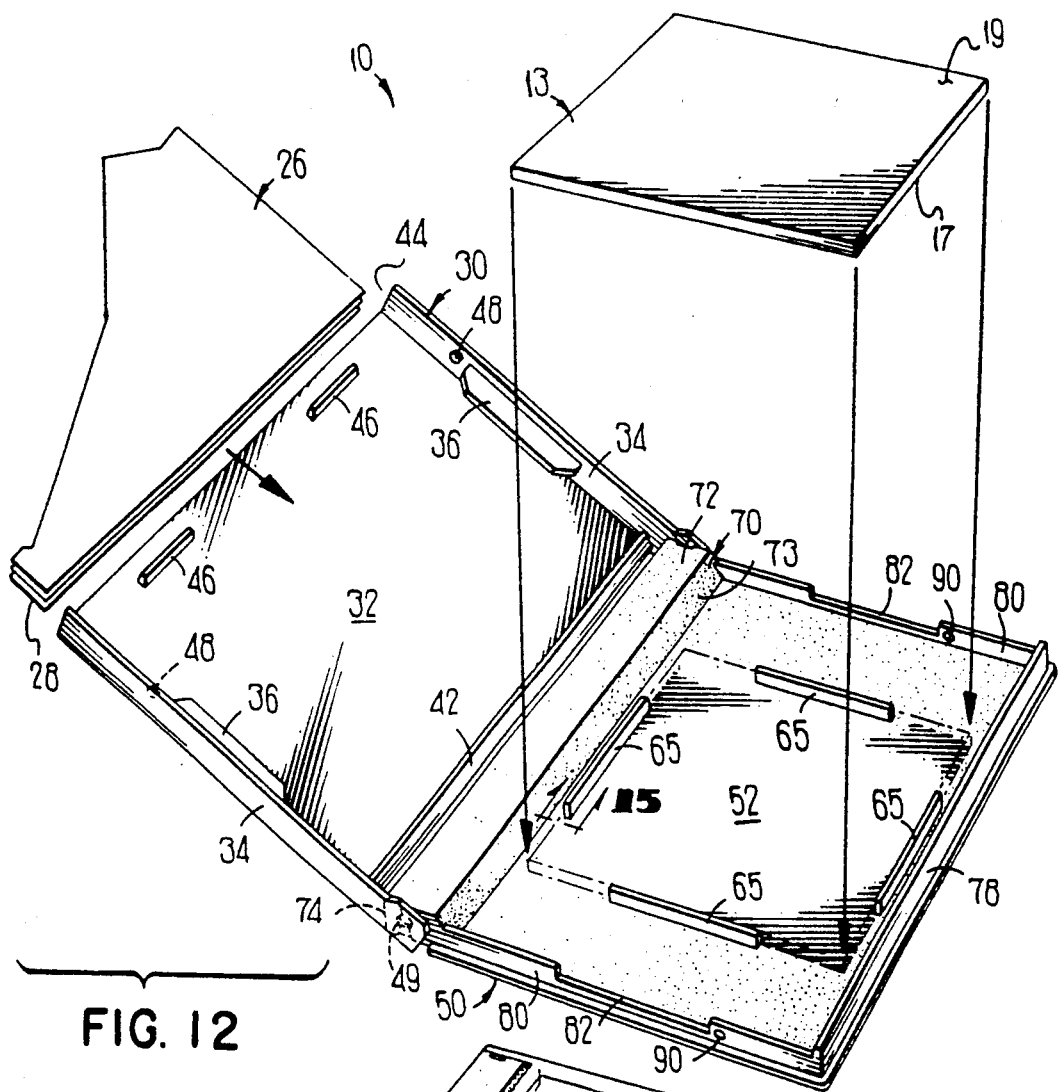
FIG. 12 is an exploded perspective view of the container having rims in the base tray in the open position, with a disk and a booklet ready for insertion.
Figure 13:
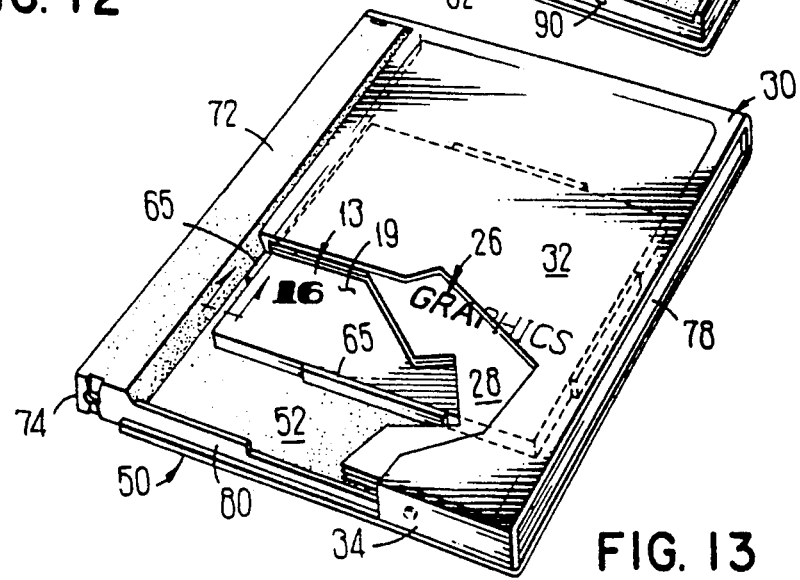
FIG. 13 is a top cut away perspective view of the container in the closed position, having rims in the base tray with a disk and a booklet.

In another embodiment, as shown in FIG. 12, the container 10 is formed of two main components, a base tray 50 and a cover 30. The base tray 50, the cover 30, and the dimensions of the container 10 in this embodiment are substantially the same as the base tray 50, the cover 30 and the dimensions for the preferred embodiment. (See FIG. 1).

The base tray 50 has four flexible raised rims 65 formed integrally with its bottom surface 52. The raised rims 65 protrude upward and substantially surround the disk 13 to ensure that is rests comfortably and securely. Though other placements of the rims may be used, at the present time, the optimum distance between each pair of parallel opposing rims seems to be 0.2 mm less than the length and the width of the disk. When the disk is inserted, the rims flex outward and create enough interference to allow the disk to rest comfortably and securely. The base tray's rear wall 70 is made up of an inner rear wall 73, and outer rear wall 74, and a top rear wall 72. Unlike the base tray 50 of the preferred embodiment, this base tray 50 does not have disk tray capture dimples 88 in its side walls 82, as shown in FIG. 1.

Figure 14:
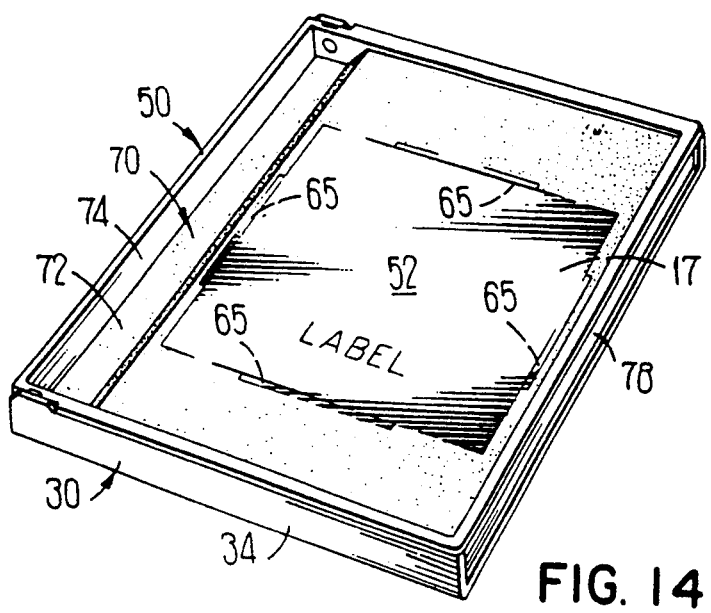
FIG. 14 is a bottom perspective view of the container having rims in the base tray in the closed position, with a disk.
Figure 15:
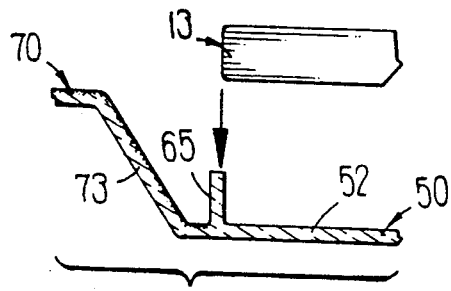
FIG. 15 is a cross-sectional side view of the container in the closed position along line 15 of FIG. 12, with a disk ready for insertion into the rims of the base tray.
Figure 16:
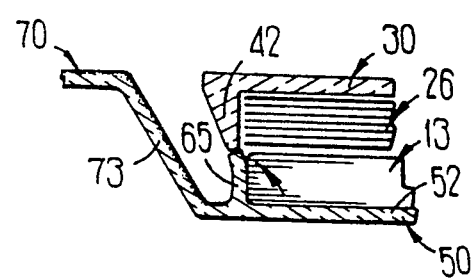
FIG. 16 is a cross-sectional side view of the container in the closed position along line 16 of FIG. 13 with a disk and a booklet inserted.
Figure 17:
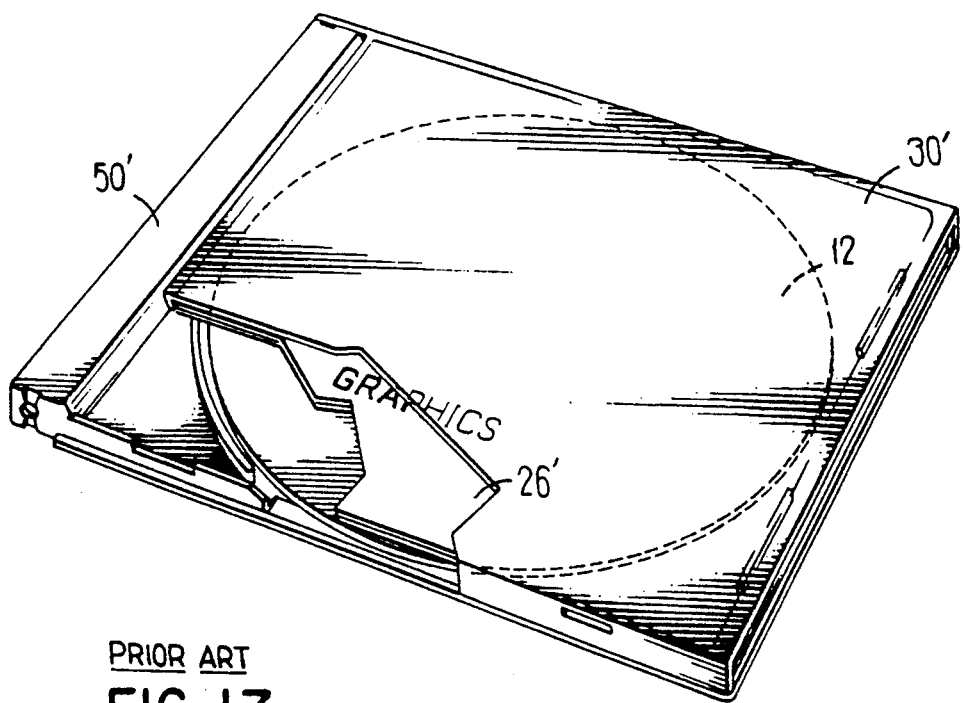
FIG. 17 is a top cut away perspective of a standard "jewel box", with a disk and a booklet.

FIG. 10 illustrates the container 10 in the closed position, in which a mini disk 13 is secured in the container 10 within the raised rims 65 of the base tray 50. As in the preferred embodiment, a booklet or card 26 is placed under the cover 30 and the disk 13 is inserted into the base tray 50 with the non-label side 19 facing the cover 30. The booklet or card 26 can be easily seen through the cover's transparent top 32. As shown in FIG. 14, the disk's label side 17 can be observed through the base tray's transparent bottom surface 52.

As best shown in FIGS. 13 to 16, the raised rims 65 substantially surround the disk 13 to secure it. When the container 10 is in the closed position, the cover's rear wall 42 rests on top of the rim 65 closest to the base tray's inner rear wall 73.

While several preferred embodiments of the present invention of a storage container for disk-shaped objects have been illustrated and described, persons skilled in the art will readily appreciate that various additional modifications and embodiments of the invention may be made without departing from the spirit of the invention as defined by the following claims.

I claim:

1. An apparatus for storing a disk-like object, said apparatus comprising:
   a base tray including a bottom portion having an inside surface, a pair of side walls protruding upwardly from said inside surface of said bottom surface, and a rear wall portion extending upwardly from said inside surface of said bottom surface;
   a cover including a top portion having an inside surface, and a pair of parallel side walls protruding downwardly from said inside surface of said top portion;
   means for hingedly connecting said base tray to said cover;
   a disk tray for receiving the disk-like object including a pair of side walls, a front wall, a rear wall, and a rear ledge extending outwardly from said rear wall, in which said rear wall, front wall and side walls of said disk tray are arranged so as to form a window; and
   means for connecting said disk tray to said base tray.

2. The apparatus of claim 1, wherein a disk mounting hub is integrally formed with said inside surface of said bottom portion of said base tray.

3. An apparatus for storing a disk-like object, said apparatus comprising:
   a base tray including a bottom portion having an inside surface, a pair of side walls protruding upwardly from said inside surface of said bottom portion, and a rear wall portion extending upwardly from said inside surface of said bottom portion;
   a cover including a top portion having an inside surface, and a pair of parallel side walls protruding downwardly from said inside surface of said top portion;
   means for hingedly connecting said base tray to said cover, said means for hingedly connecting including a plurality of depressions, each respectively located on an outside rear portion of one of said side walls of said base tray, and a plurality of protrusions, each respectively located on an inside rear portion of one of said side walls of said cover and corresponding in shape and position to a respective one of the depressions in a corresponding side wall of said base tray;
   a disk tray for receiving said disk-like object including a pair of side walls, a front wall, a rear wall, and a rear ledge extending outwardly from said rear wall; and
   means for connecting said disk tray to said base tray.

4. An apparatus for storing a disk-like object, said apparatus comprising:
   a base tray including a bottom portion having an inside surface, a pair of side walls protruding upwardly from said inside surface of said bottom portion, and a rear wall portion extending upwardly from said inside surface of said bottom portion;
   a cover including a top portion having an inside surface, and a pair of parallel side walls protruding downwardly from said inside surface of said top portion;
   means for hingedly connecting said base tray to said cover;
   a disk tray for receiving said disk-like object including a pair of side walls, a front wall, a rear wall, and a rear ledge extending outwardly from said rear wall; and
   means for connecting said disk tray to said base tray including at least one protrusion each located on an outside portion of the disk tray side walls, and at least one depression each located on an inside portion of the base tray side walls and respectively corresponding in shape and position to the protrusion in a corresponding disk tray side wall.

* * * * *